March 9, 1937. W. WOELFLIN 2,072,917
METHOD OF AND APPARATUS FOR ELECTRICALLY TREATING TAR EMULSIONS
Filed Feb. 12, 1934 3 Sheets-Sheet 1
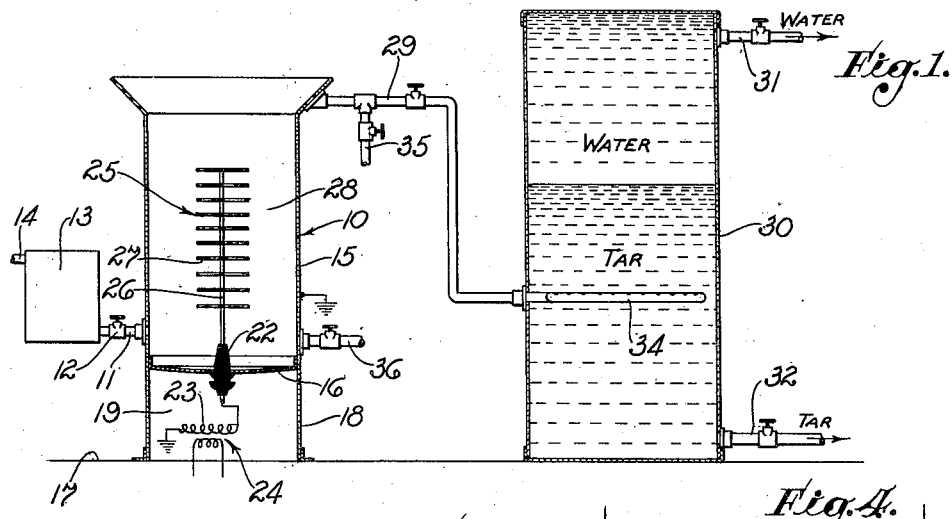
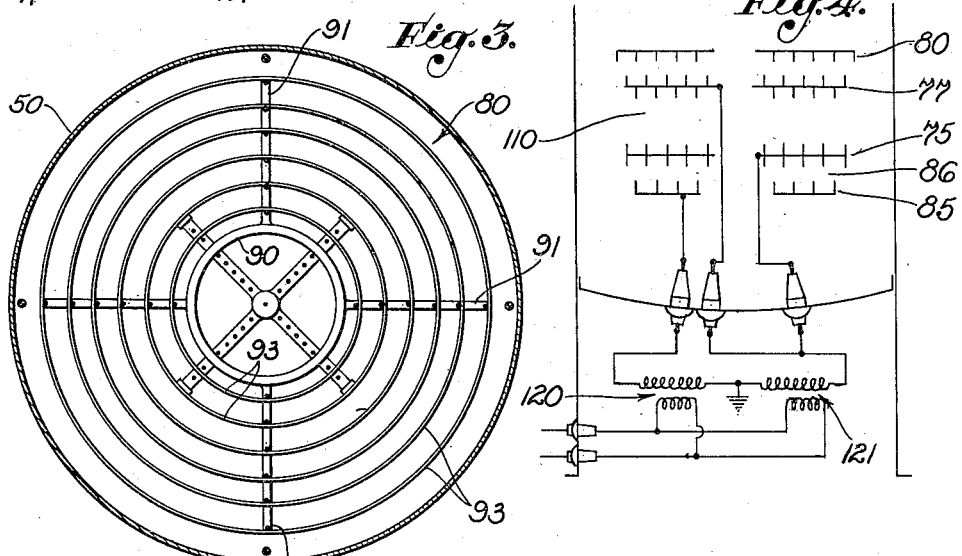
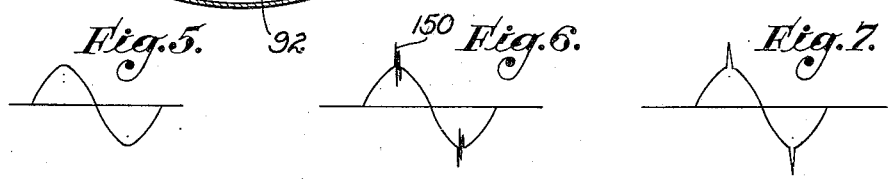
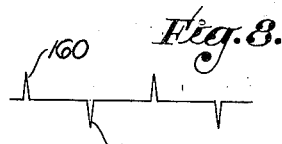
INVENTOR:
WILLIAM WOELFLIN
BY
Fred W. Harris
ATTORNEY.

March 9, 1937.  W. WOELFLIN  2,072,917
METHOD OF AND APPARATUS FOR ELECTRICALLY TREATING TAR EMULSIONS
Filed Feb. 12, 1934   3 Sheets-Sheet 2

INVENTOR:
WILLIAM WOELFLIN
BY
ATTORNEY

March 9, 1937. W. WOELFLIN 2,072,917
METHOD OF AND APPARATUS FOR ELECTRICALLY TREATING TAR EMULSIONS
Filed Feb. 12, 1934 3 Sheets-Sheet 3

INVENTOR:
WILLIAM WOELFLIN
BY
ATTORNEY.

Patented Mar. 9, 1937

2,072,917

UNITED STATES PATENT OFFICE 2,072,917

METHOD OF AND APPARATUS FOR ELECTRICALLY TREATING TAR EMULSIONS

William Woelflin, Long Beach, Calif., assignor to Petroleum Rectifying Company of California, Los Angeles, Calif., a corporation of California Application February 12, 1934, Serial No. 710,857

12 Claims. (Cl. 204—24)

My invention relates to a process and apparatus for treating tar emulsions, particularly such tar emulsions as are produced in certain by-product coke-ovens or in the manufacture of artificial gas. It is in these connections that the invention will be particularly described, though it will be distinctly understood that the novel features herein disclosed are not limited to these emulsions, the process in general being applicable to the treatment of any emulsion or tar mixture, or any other emulsion or mixture in which the lighter phase has a relatively higher electrical conductivity than does the heavier phase.

The invention is particularly applicable to those emulsions produced when coal or coke is heated to a sufficiently high temperature to expel vapors or gases, and when these products are brought into contact with an aqueous medium are either thereupon condensed or thereafter condensed, the condensate forming a mixture of tar and an aqueous phase. It is also particularly well suited to treatment of emulsions formed during the process of manufacture of artificial gas. In most of such emulsions the aqueous phase is the dispersed phase, and such emulsions or mixtures are particularly susceptible to the electrical treating process to be hereinafter described.

More particularly, the invention can be very advantageously applied to the treatment of emulsions or mixture produced during the operation of by-product coke-ovens. In the ordinary operation of such by-product coke-ovens, the gases produced by the coking operating leave the ovens at high temperature and are normally cooled by being brought into contact with an aqueous medium. Thus, these gases may be cooled by the use of sprays of ammonia liquor, ammonia liquor and tar, or water. Such subjection to an aqueous medium separates a portion of the tarry constituents in the gases. The gases may be further cooled in condensers to separate additional quantities of tar and aqueous liquors. I have found that such mixtures of tar and water (the water being either pure or containing material in solution) can be conveniently and very economically separated by subjection to a high intensity electric field. If desired, the mixtures formed at different points in the process may be separately treated by the system to be hereinafter described, though it is often desirable to preliminarily mix such separately formed condensates to form a tar-water mixture, this mixture being then subjected to the action of a high intensity electric field. In the following description I refer to tar-water emulsions or mixtures as including one phase which is predominately of a tarry character, and the other phase which is water, either in a relatively pure state or in the form of an aqueous solution.

So also, in the manufacture of artificial gas by the water-gas process, the invention can be used to advantage in treating the emulsions formed. In such processes it is conventional in the first part of the cycle to heat a body of coal or coke, blowing air therethrough. Producer gases are formed and are usually used for heating purposes in other parts of the process, usually in the carburetor and super heater. Steam is then introduced into the generator containing this heated coal or coke. Water-gas is thus formed and passes into the carburetor where a stream of oil may be introduced. The oil is decomposed forming illuminating gases which mix with the water-gas, these gases passing into the superheater. The gases which leave the superheater are very hot and may be cooled by being passed through a wash-box, condensers, scrubbers and purifiers, or by other means. Although the gas is cooled differently in different plants, in nearly all plants it is common practice to employ a water seal or wash-box directly after the superheater. Some of the tar and water condenses and is removed in the wash-box water, and some remains in the gas and passes on to the relief holder and throughout the system. As the gas is cooled, however, additional amounts of the tar and water condense and form an emulsion, such emulsion forming throughout the whole system to a point where the gas is free from tar. Thus, the "drips" at the inlet and outlet of the relief holder, scrubbers, condensers, etc., all contain tar emulsions which can be immediately subjected to the action of an electric field or can be preliminarily treated before subjection thereto, the resultant tar emulsion being introduced into the electric field. So also, tar and emulsion are removed in an electric precipitator, if used.

Often the emulsions produced at various points in such a process can be individually treated by the electrical system to be hereinafter described, the electric treater in this instance being designed to be most effective with regard to the particular emulsion being treated. These emulsions are not, however, of the same character, certain of these emulsions being relatively more stable than others. Usually it is desirable to collect one or more of these emulsions in a common storage pit at the gas works to form a composite mixture representing the condensates from a number of the drips where the tar emulsions collect, and the herein described system is particularly applicable to the treatment of such a composite condensate.

Such emulsions produced in the operation of by-product coke-ovens or in the manufacture of artificial gas are ordinarily composed of a continuous phase of tar and a dispersed phase of water. The water content may vary from one per cent to approximately eighty-five per cent. The tar in these emulsions forms a valuable by-product when separated, being extensively used without treatment as a liquid fuel, preservative for timber, etc., or it may be distilled and thereby separated into various fractions to recover benzol, phenols, etc., some of which may be used in the manufacture of dye intermediates, etc. Usually, however, such tar cannot be marketed at full value if the water content thereof is substantially greater than three per cent.

The present methods of dehydrating tar-water emulsions involve either the application of heat followed by prolonged settling or the application of sufficient heat to distill off the water. In the former process the rate of settling is very slow and this method requires a relatively large storage capacity which, of course, increases dehydration costs. In the latter process wherein the water is removed by distillation, the emulsion is run into a still, the water vapors being thereafter condensed. This method is unsatisfactory for several reasons. In the first place, the tar emulsion foams when distilled, thus causing some of the tar emulsion to be thrown over with the condensate. If the distillation is carried out slow enough to avoid foaming over, the throughput of the still becomes very low. In the second place, this method ordinarily removes a portion of the lighter constituents of the tar which is often very undesirable in that these lighter constituents are removed from the resulting product. In the third place, such a method is quite expensive, the cost thereof being ordinarily in the neighborhood of two cents per gallon.

In the present process these separation difficulties are overcome by the utilization of an electric field for coalescing the dispersed phase. Not only does this eliminate trouble with foaming and loss of certain of the lighter distillates, but the electrical method hereinafter described is much more economical, usually cutting dehydration costs in half. So also, it permits operation of the water-gas plant, for instance, with much heavier oil used in the carburetor than is otherwise commercially possible, thus saving many thousands of dollars in oil costs.

It is an object of the present invention to provide a novel method and apparatus for thus electrically treating tar-water emulsions.

It is sometimes possible to electrically treat such emulsions at substantially atmospheric temperatures. Usually, however, best results are obtained if the emulsion is preliminarily heated. If desired, the emulsion may be electrically dehydrated shortly after it is formed, thus utilizing the heat inherent therein to facilitate dehydration. Usually dehydration is most successful between 120° F. and 210° F., if treatment takes place at atmospheric pressure; otherwise these figures will be increased in proportion to the amount of pressure utilized, keeping in mind that it is never desirable to heat the emulsion to such a temperature that the water content thereof will boil under the existing pressure. These limits are not, however, absolute, and the most advantageous temperature varies with different emulsions. Usually, the higher temperatures have been found to be preferable with most tar emulsions, most of these emulsions being treatable within the temperature range of 160° F. to 210° F., considering that treatment takes place at atmospheric pressure. As above mentioned, with higher pressures, these temperature ranges will correspondingly change.

It is an object of the present invention to electrically treat tar-water emulsions at temperatures above atmospheric but below the boiling point of the water phase.

It is a further object of the invention to facilitate electrical treatment of such emulsions by increasing the pressure thereon during the subjection to the electric field. With many emulsions it is desirable to use a pressure-type treater, better results being obtained under pressure especially on emulsions having a strong tendency to foam. So also, in a closed pressure-type treater all danger of fire is eliminated.

In such an electrical dehydrating process the resulting tar, at a temperature of 35° C. (95° F.), for instance, ordinarily has a specific gravity greater than 1.00. The specific gravity of the water phase is usually approximately 1.00, since this water results from condensing steam, and may be pure water except for a small amount of organic matter which may be dissolved from the tar, or other dissolved substances in the water phase. Thus, the separated tar is heavier than the water, and if the mixture is allowed to gravitationally separate following electrical treatment, the tar will move to the bottom of the container, while the water will move to the upper end thereof.

It is an object of the present invention to provide an electric treater and method capable of treating emulsions or mixtures, the heavier phase of which comprises a liquid of relatively poor electrical conducting properties, while the lighter phase of which comprises a liquid of relatively good electrical conducting properties.

In designing such a treater we have found it ordinarily desirable to introduce the energizing current into the container from the lower end thereof, and it is an object of the present invention to provide a treater in which the insulator bushings extend into the lower portion of the container. If desired, these bushings may be surrounded by the heavier non-conducting phase, such as tar.

So also, with many electrode structures it is desirable to provide insulator means for mounting one or more portions of the electrode structure, and it is a further object of the present invention to provide a structure in which such insulator means is positioned in the lower portion of the container.

With certain tar-water emulsions a certain amount of residue may settle to the bottom of the container, being somewhat heavier than the tar. If necessary to protect the insulator means or insulator bushing from such residue, I have found it desirable to withdraw the tar, or other material of poor electrical conductivity, from the lower portion of the container and from the vicinity of the electrode means or bushing. In this way a stream of outflowing liquid washes the insulator means or bushing and prevents any deposition of the residual matter thereon. It is an object of the present invention to provide such a treater.

A wide range of potentials can be utilized in successfully treating such tar-water emulsions. Best results are ordinarily obtained if an alternating or pulsating potential is utilized. The commercial 50 or 60 cycle current ordinarily produces very satisfactory results, though with certain emulsions higher frequency is desirable, ranging from 60 to 100,000 cycles per second. In other instances it is desirable to utilize potentials of particular wave form. Thus, wave forms of a peaked character are often desirable due to the extremely steep wave fronts produced. It is an object of the present invention to provide a method and apparatus for dehydrating tar-water emulsions utilizing such frequencies or such wave forms.

Other objects of the invention lie in the particular treater constructions to be hereinafter described in detail, as well as in the electrode structures to be particularly described, certain of the features of these treaters and electrode structures being novel irrespective of whether or not tar-water emulsions are being treated.

Still further objects and advantages of the invention will be evident to those skilled in the art from the following description:

Referring to the drawings,

Fig. 1 illustrates one form of electrical treating system.

Fig. 3 is a sectional view taken on the line 3—3 of Fig. 2.

Fig. 4 is a diagrammatic view illustrating another method of electrically connecting the electrode system disclosed in Fig. 2.

Figs. 5 to 8, inclusive, diagrammatically illustrate different wave forms which may be used to advantage in the present invention.

Figure 9:
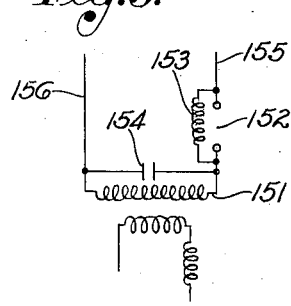

Fig. 9 illustrates one type of circuit that can be used in producing peaked or high frequency potentials.

Figure 10:
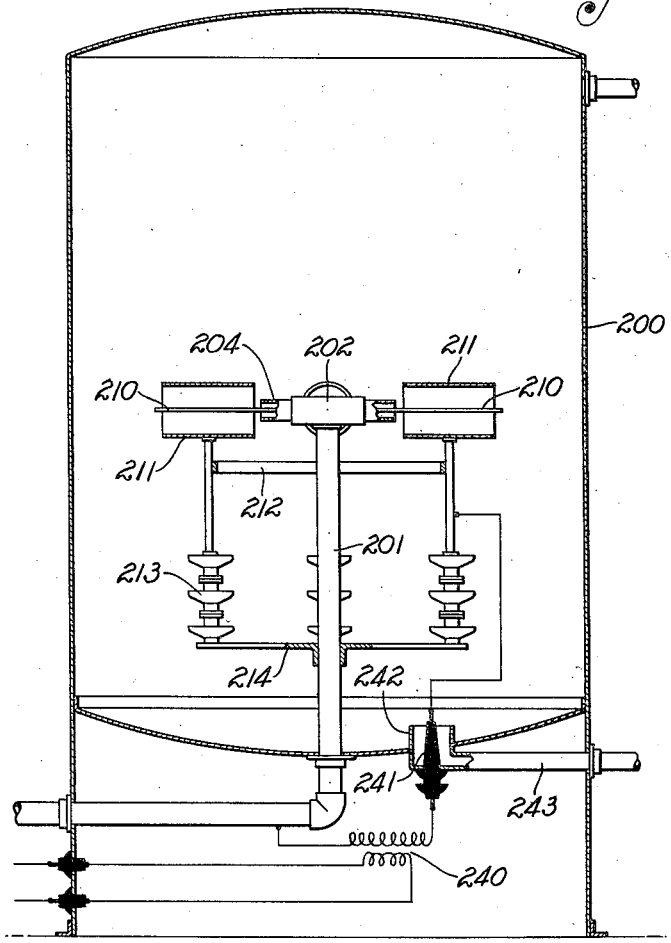

Fig. 10 illustrates an alternative form of treater.

Figure 11:
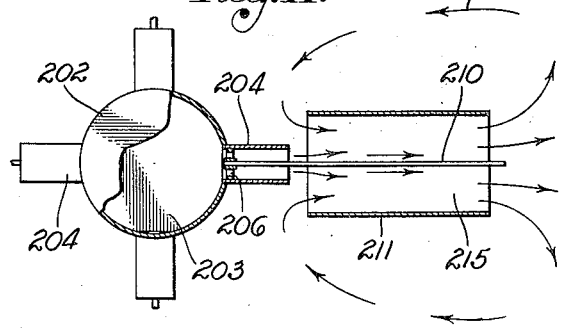

Fig. 11 is a fragmentary view illustrating the details of the electrode structure shown in the form of treater illustrated in Fig. 9.

Referring particularly to Fig. 1, herein is shown one system which can be used in performing the process of the invention. The electric treater is indicated by the numeral 10 and is supplied with tar-water emulsion by a pipe 11 including a valve 12. This pipe may carry a composite tar-water emulsion formed, for instance, of a mixture of several different tar emulsions, or may carry only the emulsion produced at a single point in the process, as mentioned above. The apparatus in which the gas is manufactured and in which the resulting gases are cooled to form the tar-water emulsion is not shown, such apparatus being well known in the art.

Whether or not the incoming tar emulsion should be heated will depend upon the particular emulsion undergoing treatment, and will also depend upon whether the emulsion is electrically treated immediately after being removed from the producing apparatus at a relatively high temperature, or is first allowed to cool before being electrically treated. If heating is desired, the temperature of the incoming emulsion can be raised to the desired degree in a heater 13, the emulsion entering this heater through a pipe 14.

The electrical treater 10 shown in Fig. 1 includes a tank 15 closed at its lower end by a bottom wall 16. It is preferable to position the bottom wall above the floor or other supporting surface 17, this being accomplished by any suitable supporting means 18 shown as comprising a cylindrical member extending downward from the tank 15. A space 19 is thus provided below the bottom wall 16.

Extending upward from this space 19 into the interior of the tank 15 is an insulating bushing 22 of any suitable type, this bushing carrying a conductor means which is connected to one terminal of a high-tension winding 23 of a transformer 24 which may, if desired, be positioned in the space 19. The remaining high-tension terminal of the winding 23 is connected to the tank through ground.

Supported by the insulating bushing 22 and extending upward in the tank 15 is a live electrode structure 25 shown as comprising a central rod 26 on which discs 27 are spaced. The space between this live electrode 25 and the tank 15 comprises a treating space 28. When the transformer 24 is energized an intense electric field is set up in this treating space, and the incoming tar-water emulsion is subjected to this field. This field is formed of sufficient intensity to coalesce the water particles of the emulsion. In the form shown separation of these water masses need not necessarily take place in the tank 15, the treated mixture moving from the upper part of the tank 15 through a pipe 29, and thence to a separating tank 30. In this tank the coalesced water masses separate, moving upward through the tar to form a body of water in the upper end of this tank, this water being continuously or intermittently withdrawn through a suitably valved pipe 31. The remaining tar, now almost completely free of water, moves to the lower end of the tank 30 and can be withdrawn through a suitable valve 32 either continuously or intermittently. Any other separating means may be utilized, such, for instance, as a centrifuge, though gravitational separation is ordinarily satisfactory, especially at the temperatures at which the treated mixture is discharged from the treater 10. If a gravitational separation is relied upon, any suitable means may be utilized for introducing into the tank 30 the treated mixture. As shown, this means comprises an annular spray pipe 34 in the tank 30 and communicating with the pipe 29. This spray pipe may be positioned either in the tar, as shown, or in the body of water which has been or is undergoing separation in the upper portion of the tank 30.

It should not be understood, however, that it is in all events necessary to utilize a separate settling tank. By suitably proportioning the dehydrator 10, it is possible to allow separation to take place therein, in which event the water may be continuously or intermittently withdrawn through the pipe 35 communicating with the pipe 29, and the tar can be continuously or intermittently removed through a pipe 36 communicating with the lower portion of the tank 15. Even if a separate settling tank 30 is utilized, a portion of the tar may settle to the bottom of the tank 15 whence it can be removed through the pipe 36.

Figure 2:
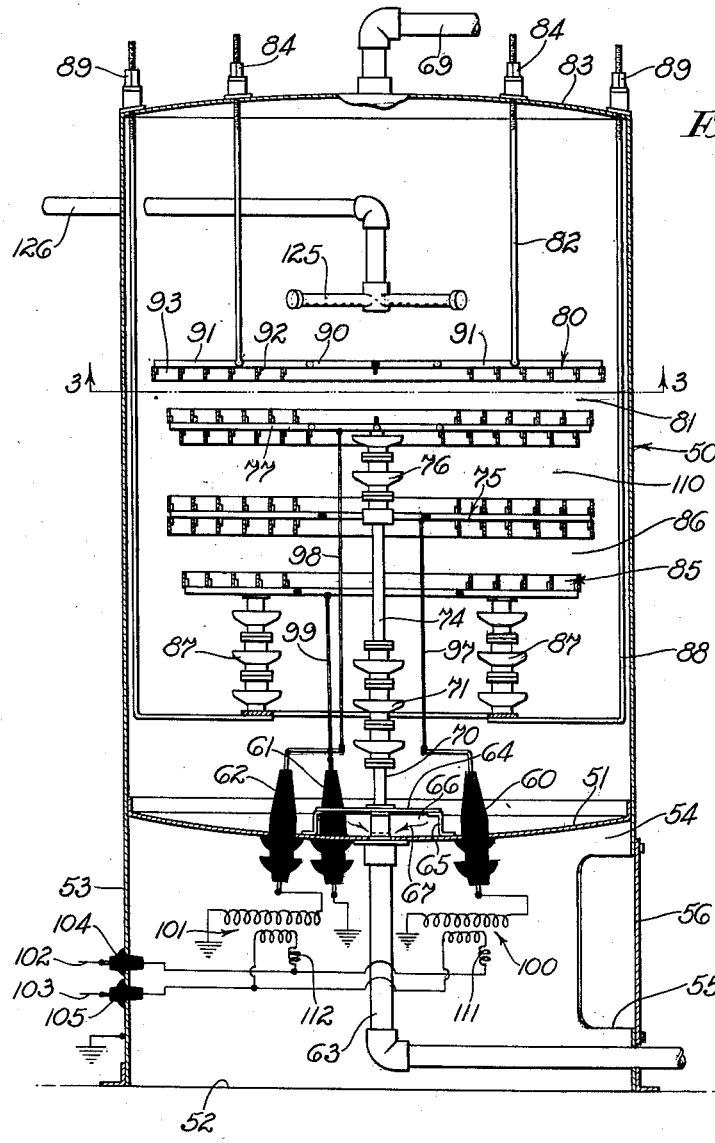
Fig. 2 illustrates an alternative form of treater.

Fig. 2 illustrates another type of treater particularly adapted to the process and in which treatment and separation take place in the same tank. Referring to this figure, the tank is indicated in general by the numeral 50 and includes a bottom wall 51 spaced above the floor 52 by any suitable supporting means 53, such as a downward extension of the tank 50. A space 54 is thus provided beneath the dehydrator which can be used to house the transformer and switching equipment if desired. A manhole 55 is preferably utilized, being closed by a cover 56 or other suitable means if desired.

The electrode means shown in Fig. 2 is particularly adapted to treatment of tar-water emulsions, though it is not limited thereto. The electrode system shown is one which can be readily connected in any one of a number of ways, a change in connection being made possible without entering the tank 50 by merely changing the electrical connections in the space 54.

I have found it very desirable to introduce the high potential leads into the treater through the bottom wall 51. In this connection I prefer to extend one or more insulating bushings upward from the space 54 through the bottom wall 51. Three of these insulating bushings are disclosed in Fig. 2, being respectively indicated by the numerals 60, 61, and 62, each bushing carrying a suitable conducting means in the conventional manner. When separation takes place in the tank 50, the tar moving to the lower end of this tank is of higher dielectric strength than the water moving to the upper end of the tank. Thus, the insulating bushings 60, 61, and 62 extend into the tank 50 in a tar environment. During such settling, however, some tar-water emulsions show a slight tendency to separate out the residue or sludge which may accumulate in the extreme lower end of the settling zone. Many tar-water emulsions are not objectionable in this regard, and even if such a residue or sludge is formed, it will not detrimentally affect the insulating bushings unless too large an amount thereof is allowed to accumulate therearound. To prevent any such excessive accumulation, I prefer to withdraw the tar from the extreme lower end of the tank 50 and from a position adjacent the insulating bushings 60, 61, and 62 so as to continuously wash the surfaces of these bushings by the outflowing tar. This may be accomplished by withdrawing the tar through a pipe 63 centrally disposed with respect to the insulating bushings, and best results are obtained if a plate 64 is spaced a slight distance above the bottom wall 51 as by arms 65. In this way a radial space 66 is formed between the plate 64 and the bottom wall 51, the outer portion of this space opening near the bushings. The separated tar thus moves into the outer portion of this space in washing relationship with the insulating bushings and moves inward into the pipe 63, as indicated by the arrows 67, thus preventing any accumulation around the insulating bushings. The coalesced water may rise in the tank 50 to form a body of water in the upper end thereof, water being removed therefrom through a pipe 69. A heating coil may be used in the bottom of tank 50 to maintain the temperature, to facilitate separation of the oil and water, or the tank may be insulated to prevent cooling of its contents by radiation.

The electrode structure disclosed in Fig. 2 includes a post 70 secured to the plate 64 and supporting a string of insulators 71. If these insulators are of petticoat type, it is preferable to position these insulators as shown, the dome portion of these insulators being disposed downwardly. Thus, any water which separates and moves around these insulators will not accumulate inside of the petticoats. This insulator means is also washed by the downward moving tar.

The upper end of the string of insulators 71 carries a post 74 to which is connected an electrode 75. Another string of insulators 76 is secured to the post 74 and supports an electrode 77, the electrodes 75 and 77 being thus insulated from each other by the string of insulators 76.

In the form of the invention shown in Fig. 2, two electrodes are adjustably suspended from the upper end of the tank 50. One of these electrodes, indicated in general by the numeral 80, is positioned above and in spaced relationship with the electrode 77 to define a treating space 81 therebetween. If the electrode 77 is a live electrode, the electrode 80 may well be grounded. As shown, this electrode 80 is supported on rods 82 extending through an upper head 83 of the tank 50. Any suitable means may be used for adjusting the position of the electrode 80. In the form shown, such means comprises nuts 84 threaded to the upper ends of the rods 81.

The other electrode suspended from the upper end of the tank is indicated in general by the numeral 85 and is positioned below and in spaced relationship with the electrode 75 so as to define a treating space 86 therebetween. The electrode 85 is preferably so supported that it can be used as a live electrode if desired. In accomplishing this end I support the electrode 85 on string of insulators 87 which are in turn supported on inward bent rods 88 extending upward through the top head 83. In the form shown, these rods are threaded at their upper ends to receive nuts 89 which, when turned, change the vertical position of the electrode 85.

The electrodes 75, 77, 80, and 85 may be of any suitable design and are preferably of interstitial character. In the embodiment shown, each of these electrodes includes an annular pipe with radial arms extending outward therefrom, a series of concentric rings being suitably secured to these arms. Thus, the upper electrode 80 includes an annular ring 90 with a series of radial arms 91 extending therefrom. Spaced at intervals along these arms are downwardly extending pins 92 to which concentric rings 93 are secured, these rings extending downward toward the electrode 77. The electrodes 75, 77, and 85 may be similarly formed. It is preferable to provide upper and lower sets of rings on the electrodes 75 and 77, and in all instances it is preferable to position the rings of adjacent electrodes so that they are not in vertical alignment. The edge of one ring is thus vertically spaced above or below the space between the rings of the adjacent electrode. The most intense portions of the fields set up between these adjacent electrodes will thus be inclined, these most intense portions being set up between the edges of the rings of the adjacent electrodes.

Various means may be utilized for energizing the electrodes. In the form shown I prefer to electrically connect the electrode 75 through the insulating bushing 60 by means of a conductor 97. Similarly, the electrode 77 is connected to a conductor 98 which is energized through the insulator bushing 62, while the electrode 85 is electrically connected to a conductor 99 associated with the insulating bushing 61. The upper electrode 80 is, of course, grounded to the tank through the rods 82. Such a system is extremely flexible in permitting the use of different electrical hookups.

One mode of connecting the electrodes is indicated in Fig. 2 and utilizes transformers 100 and 101, the primary windings of which may be connected in parallel to conductors 102 and 103, insulating bushings 104 and 105 being provided to carry these conductors into the space 54. In the hookup shown in Fig. 2, one terminal of the high-tension winding of the transformer 100 is electrically connected to the electrode 75, the other terminal being grounded. The electrode 85 is also grounded so that the transformer 100 is effective in setting up a high potential field in the treating space 86. Similarly, the electrode 77 is connected to one high-tension terminal of the transformer 101, the other terminal being grounded. Thus, the transformer 101 sets up a high-intensity electric field in the treating space 81. It is preferable to so connect the transformers that the potential of the live electrodes 75 and 77 build up synchronously so that no electric field is established between these electrodes, the space between these electrodes thus being of an equipotential nature, this space being indicated by the numeral 110. This, of course, is only true when the transformers 100 and 101 are of identical characteristics, and when the currents taken by the fields in the spaces 81 and 86 are substantially equal. This latter factor is especially important if current-limiting choke coils are used in the transformer circuits. It is usually desirable to install such chokes in the primary circuits of the transformers as indicated by the numerals 111 and 112.

In all instances it is desirable for purposes of economy to eliminate leakage currents between the live electrodes and the tank or to other portions of the apparatus, if such leakage currents do not facilitate electric treatment. The electrode system and method of connection shown in Fig. 2 is particularly valuable in this regard, for by maintaining the electrodes 75 and 77 at substantially the same potential, leakage currents therebetween are eliminated. Thus, it has been found that the necessary current when the electrodes are connected as shown will be less than the sum of the currents required if the upper and lower sets of electrodes are individually energized. So also the ring construction shown in Fig. 2 is particularly valuable in that it presents a minimum surface for leakage currents to pass between the live electrodes and the tank.

Another method of electrically connecting the transformers which is particularly applicable with many tar-water emulsions is shown in Fig. 4. Here transformers 120 and 121 are utilized, one terminal of each secondary winding of these transformers being grounded. The remaining high-tension terminal of the transformer 121 is connected to the electrode 75, and also to the electrode 77, while the remaining high-tension terminal of the transformer 120 is connected to the electrode 85. The primary windings of these transformers may be connected in parallel, but with this hookup it is desirable that the transformers be connected in additive relation. The result is that the potential across the treating space 81 between the electrodes 77 and 80 is equal to the potential of the transformer 121. With the connection shown, no field will be established in the space 110 between the electrodes 75 and 77. However, between the electrodes 75 and 85 a potential will be impressed which is substantially double the potential developed by either the transformer 120 or the transformer 121. This double intensity field is positioned so that the material moving thereinto has already received a preliminary treatment in the treating space 81 so that a portion of the water content has already been removed from the emulsion before it enters the high-intensity field in the treating space 86. This method of connection is often very desirable in producing tar of low water content. It will also be noted that the emulsion is first subjected to the action of the field in the treating space 81, after which it flows through the equipotential space 110 between the electrodes 75 and 77, after which it is subjected to a very high intensity field. This method of procedure is particularly desirable with certain types of tar-water emulsions.

With the form of apparatus shown in Fig. 2, it is usually preferable to introduce the incoming emulsion at a position above the electrode 80 so that this emulsion may be moved downward through the fields as described. This may be accomplished by using a spray pipe 125 through which the incoming emulsion is delivered through a pipe 126. If desired the spray pipe may include openings extending downward to force the incoming emulsion between the rings of the electrode 80 and directly into the fields set up in the treating space 81.

In other instances it is possible to use the treater shown in Fig. 2 with only one transformer, energizing any desired pair of electrodes by respectively connecting these electrodes to the high-tension terminals of this transformer. Usually, however, a double transformer system will produce better results, though it will be understood that such double transformer systems are not necessary to the successful treatment of tar-water emulsions by the present process.

Usually entirely satisfactory treatment can be obtained by the use of alternating current of 50 or 60 cycles per second and of a wave form similar to that shown in Fig. 5 which is the ordinary commercial sine wave. With certain types of tar-water emulsions, however, higher frequencies are desirable, these frequencies ranging from 60 cycles to 100,000 cycles per second. Steep wave fronts often produce superior results, which may be one explanation of a superior action taking place at higher frequencies.

It is not, however, necessary to resort to such high frequencies to obtain desirable steep wave fronts. It is often possible to superimpose steep wave front surges on commercial-frequency alternating potentials, or even on direct current potentials. Thus, a wave form such as shown in Fig. 6 may often be used to advantage in which a series of high frequency pulsations 150 are impressed at or near the peak potential of the commercial-frequency alternating current. By suitable design such a wave form can be produced by a system shown in Fig. 9 in which the secondary winding of the transformer is indicated by the numeral 151. A spark gap 152 may be used in series with this secondary winding, a resistance or reactance 153 being shunted across this spark gap. A condenser 154 is suitably connected to the circuit, preferably across the secondary winding as shown. When a pair of electrodes is connected to conductors 155 and 156, either directly or through any suitable connecting means, the potential across these electrodes will build up. As the current across these electrodes increases the voltage drop across the reactance 153 will increase to such an extent that the spark gap 152 will break down, thus by-passing the reactance from the circuit. When the spark gap 152 breaks down, the condenser 154 sets up a single surge or a series of surges, such as shown in Fig. 6, these surges being of high frequency, depending upon the characteristics of the circuit. In other instances it is possible to use the circuits shown in Fig. 9 without the resistance or reactance 153 to form a high frequency potential applied to the electrodes at each break-down of the spark gap.

In Fig. 7 I have shown another wave form which may be used to advantage and which includes a single surge or peak formed each half cycle of the potential. Such a peak has a steep wave front and produces the desirable results attributable to such steep wave fronts.

Another wave form which can be used is diagrammatically indicated in Fig. 8 and which involves the intermittent production of peaks 160 which may be alternately positive and negative, as shown, or which may all be of a single sign. Wave forms such as shown in Figs. 6, 7, and 3 may be produced by various generating means or potential-varying means.

In Figs. 10 and 11 I have shown another form of treater often advantageous on certain types of tar emulsions. Here a tank 200 is used and the incoming emulsion moves through a pipe 201 to a distributor 202 providing a chamber 203. Nozzles 204 communicate with this chamber and expel streams of the emulsion outward. Mounted in a spider 206 of the distributor 202, and centrally disposed in each nozzle 204 is a grounded rod 210 forming an inner electrode. An outer electrode, preferably in the form of a sleeve 211, surrounds each rod 210, the sleeves 211 being electrically connected together as by a ring 212 and electrically insulated from the tank as by strings of insulators 213 mounted on a support 214. The space between each rod electrode 210 and its corresponding sleeve electrode 211 provides a treating space 215 of annular shape and an electric field is established therein by any suitable means. This field will be more concentrated adjacent the rod electrode due to the concentric nature of the electrodes, and the nozzle 204 associated therewith forms an envelope of emulsion which is forced into the most intense portion of this field to flow along the rod electrode and through the sleeve electrode. This method of emulsion introduction causes a recirculation of treated material through the field around and through the sleeve electrode, as indicated by the arrows 220. As this treated material has already been subjected to a treating and settling action, and as the electrode structure is positioned in or near the tar zone of the tank 200 it follows that the material thus drawn into the field due to the injection of the emulsion is of higher dielectric strength than the emulsion and serves to prevent excessive current flow between the electrodes. So also, with such a system the emulsion is successively treated by the electric field in the treating space and is also subjected to the fields between the sleeve electrodes 211 and the tank 200. In this form of treater the emulsion is subjected to the fields in the treating spaces for only a short period of time, after which they move into a settling zone inside the tank.

The sleeve electrodes 211 may be energized by a high tension transformer 240, current being conducted to the electrodes through a bushing 241. In the form shown, tar is removed from the bottom of the tank in a zone immediately around the insulator bushing 241. If desired, a structure may be used which includes an upward extending sleeve 242 defining an annular space around the bushing 241, the tar being withdrawn from the bottom of the tank through this annular space and through a pipe 243 in a manner to very effectively wash the bushing.

It is often desirable to carry out the electric treatment of tar emulsions under a pressure greater than atmospheric. This pressure need not be high, usually below 50 lbs. per square inch, but is of value in treating certain tar emulsions, especially those which have a tendency to foam. By maintaining sufficient pressure it is possible to eliminate such foaming, thus obtaining much better treatment. The tendency to foam, if not overcome, tends to prevent rapid separation of the constituents and also constitutes a fire hazard. If gravitational separation is relied upon it is most important that excessive agitation be eliminated in the settling zone, especially in view of the fact that the densities of the two phases are rather close to each other.

It will be clear that the present invention is not limited for utility to the apparatus shown. The methods herein involved can be performed by various types of apparatus, the form shown being merely illustrative of the preferred embodiments. So also, certain of the features shown in the apparatus disclosure of this application are not limited to the treatment of tar-water emulsions, but can be used to advantage with other emulsions or liquids. This is especially true of the electrode structure disclosed in Fig. 2, the features of which can be readily adapted to the treatment of different emulsions.

I claim as my invention:

1. In an electric treater for treating mixtures in which the continuous phase comprises a liquid of relatively poor electrical conductivity and the dispersed phase comprises a relatively more conducting liquid of a density less than the liquid of said continuous phase, the combination of: a container; electrode means for setting up an electric field in a lower portion of said container of sufficient intensity to coalesce said dispersed phase, said container providing a separating zone in which said coalesced phase can rise through said liquid forming said continuous phase to form a body of liquid in an upper portion of said container, leaving a body of said liquid of relatively poor conductivity in the lower portion of said container; an insulator means in said lower portion of said container and supporting at least a portion of said electrode means, said insulator means being in the zone occupied by said body of liquid of relatively poor conductivity; and means for withdrawing said liquid phase of relatively poor conductivity from said container, said means being positioned adjacent said insulator means to withdraw said liquid phase from the vicinity thereof thereby washing said insulator means with a stream of said liquid phase.

2. In combination in a treater for tar-water emulsions, the combination of: a tank; insulator means in said tank; electrode means in said tank associated with said insulator means and establishing an electric field of sufficient intensity to coalesce the water droplets of said emulsion; walls defining a passage around said insulator means and extending in spaced relationship with said insulator means; and means for moving a stream of tar through said passage in washing relationship with the surface of said insulator means to prevent accumulation thereon of sludge associated with the tar in said tank.

3. A method of treating a tar-water emulsion, which method includes the steps of: introducing said tar-water emulsion into a chamber; establishing an electric field in said chamber of sufficient intensity to coalesce the dispersed water droplets into masses of sufficient size to rise in said tar and accumulate in the upper end of said chamber above said electric field; eliminating foaming of said emulsion by maintaining in said chamber a pressure greater than atmospheric pressure; withdrawing said water from the upper end of said chamber; and withdrawing said tar from the lower end of said chamber.

4. A method of treating a tar-water emulsion, which method includes the steps of: establishing an electric field of sufficient intensity to coalesce the dispersed water droplets; flowing said tar-water emulsion downwardly through an electric field and into a space therebelow in which space said water droplets tend to separate from the tar and again rise into said electric field; collecting said water at a point above said electric field; and collecting said tar at a point below said electric field.

5. A method of treating a tar-water emulsion, which method includes the steps of: establishing in a chamber a plurality of superimposed electric fields; flowing said tar-water emulsion downward through said fields, each field acting to coalesce the dispersed water droplets into larger masses, the coalesced droplets rising from the point of coalescence through any of said electric fields thereabove and the tar dropping through said fields; collecting said water in the upper end of said chamber; and collecting said tar in the lower end of said chamber.

6. A method as defined in claim 5 in which said superimposed fields are separated by an equipotential space in which said coalesced water droplets may separate from said tar and in which the water droplets coalesced in the lowermost field rise through said equipotential space and then into the uppermost of said fields.

7. A method as defined in claim 5 in which two electric fields are established, and in which the lower of said fields is of greater intensity than the upper of said fields.

8. A method of electrically treating a tar-water emulsion containing sludge by the use of electrode means and electric insulating means associated therewith, which method includes the steps of: maintaining in a chamber bodies of said water and said tar with the tar in that end of said chamber containing said insulating means; energizing said electric means through said end of said chamber to establish an electric field of sufficient intensity to coalesce the water droplets of said tar-water emulsion into masses of sufficient size to move to said body of water leaving the tar and sludge in said end of said chamber; withdrawing water from the other end of said chamber; and withdrawing said tar from said one end of said chamber in washing relationship with said insulating means to prevent the accumulation thereon of said sludge.

9. A method of electrically treating a tar-water emulsion containing sludge by the use of electrode means and electric insulating means associated therewith, which method includes the steps of: electrically treating said tar-emulsion in a chamber to coalesce the water droplets into masses of sufficient size to rise from said tar and said sludge; and moving a stream of said tar in washing relationship with said insulating means to prevent the accumulation thereon of said sludge.

10. In an electric treater for treating mixtures in which the continuous phase comprises a liquid of relatively poor electrical conductivity, and the dispersed phase comprises a relatively more conducting liquid of a density less than the liquid of said continuous phase, the combination of: a container; electrode means for setting up an electric field in a lower portion of said container of sufficient intensity to coalesce said dispersed phase, said container providing a separating zone in which said coalesced phase can rise through said liquid forming said continuous phase to form a body of liquid in an upper portion of said container, leaving a body of said liquid of relatively poor conductivity in the lower portion of said container; an insulating bushing extending through a wall of said container and into said lower portion of said container; conductor means extending through said insulating bushing and into said liquid of relatively poor electrical conductivity for energizing said electrode means; and means for withdrawing said liquid phase of relatively poor conductivity from said container, said means being positioned adjacent said insulating bushing to withdraw said liquid phase of relatively poor conductivity from the vicinity thereof, thereby washing said insulating bushing with a stream of this liquid phase of relatively poor conductivity.

11. In an electric treater for treating mixtures in which the continuous phase comprises a liquid of relatively poor electrical conductivity and the dispersed phase comprises a relatively more conducting liquid of a density less than the liquid of said continuous phase, the combination of: a container providing a bottom wall; electrode means for setting up an electric field in a lower portion of said container of sufficient intensity to coalesce said dispersed phase, said container providing a separating zone in which said coalesced phase can rise through said liquid forming said continuous phase to form a body of liquid in an upper portion of said container, leaving a body of said liquid of relatively poor conductivity in the lower portion of said container; an insulating bushing extending upward through said bottom wall of said container and into said lower portion of said container; conductor means extending through said insulating bushing and into said liquid of relatively poor electrical conductivity for energizing said electrode means; and compression insulator means extending upward in said container to support said electrode means independently of said conductor means.

12. In an electric treater for treating mixtures in which the continuous phase comprises a liquid of relatively poor electrical conductivity and the dispersed phase comprises a relatively more conducting liquid of a density less than the liquid of said continuous phase, the combination of: a container; electrode means for setting up an electric field in a lower portion of said container of sufficient intensity to coalesce said dispersed phase, said container providing a separating zone in which said coalesced phase can rise through said liquid forming said continuous phase to form a body of liquid in an upper portion of said container, leaving a body of said liquid of relatively poor conductivity in the lower portion of said container; an insulating bushing extending through a wall of said container and into said lower portion of said container; conductor means extending through said insulating bushing and into said liquid of relatively poor electrical conductivity for energizing said electrode means; means for supporting said container above a foundation, said means leaving a space beneath the lower end of said container and above said foundation; and transformer means in said space and including a high-tension terminal electrically connected to said electrode means through said conductor means whereby the high-tension terminal of said transformer is exclusively in said space to prevent accidental contact therewith.

WILLIAM WOELFLIN.